(12) United States Patent
Ragozin et al.

(10) Patent No.: US 8,306,798 B2
(45) Date of Patent: Nov. 6, 2012

(54) FLUID DYNAMICS SIMULATOR

(75) Inventors: Dmitry Ragozin, Partizanskaya (RU);
Dmitry Pyadushkin, Krasnoselskaya (RU)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 12/343,546

(22) Filed: Dec. 24, 2008

(65) Prior Publication Data

US 2010/0161702 A1    Jun. 24, 2010

(51) Int. Cl.
*G06F 17/50* (2006.01)
(52) U.S. Cl. .......................................................... 703/9
(58) Field of Classification Search .................. 703/9, 2
See application file for complete search history.

(56) References Cited

U.S. PATENT DOCUMENTS

| | | | | |
|---|---|---|---|---|
| 5,604,911 A * | 2/1997 | Ushiro | ............................... | 703/2 |
| 5,819,251 A * | 10/1998 | Kremer et al. | ........................ | 1/1 |
| 5,926,399 A * | 7/1999 | Berkooz et al. | .................... | 703/7 |
| 6,009,741 A * | 1/2000 | Wagner | ........................... | 73/1.57 |
| 6,446,105 B1 * | 9/2002 | Washio et al. | ................. | 708/520 |
| 2006/0089803 A1 * | 4/2006 | Lei et al. | ............................ | 702/1 |
| 2007/0219766 A1 * | 9/2007 | Duggleby et al. | ................. | 703/9 |

OTHER PUBLICATIONS

Stephan Turek, Sven Buijssen, Hilmar Wobmer, "High Performance FEM Simulation in CFD and CSM" 2005, pp. 46-49.*

* cited by examiner

*Primary Examiner* — Dwin M Craig
(74) *Attorney, Agent, or Firm* — Trop, Pruner & Hu, P.C.

(57) ABSTRACT

In some embodiments, the Navier-Stokes matrix A may be developed on the fly using arrays of Dirichlet and von Neumann boundary conditions. As a result, the storage requirements are dramatically reduced and hardware accelerators or single instruction multiple data processors may be used to solve the Navier-Stokes equations.

23 Claims, 1 Drawing Sheet

FLUID DYNAMICS SIMULATOR

BACKGROUND

This relates generally to the simulation of fluid flow.

Fluid dynamics simulators can simulate the flow of fluid, such as water waves. The simulator solves the Navier-Stokes equation which describes the state of the fluid.

Conventional methods for solving Navier-Stokes equations use a regular grid that requires numerical solution of an extremely large linear matrix equation Ax=b, where the sparse quadratic matrices A have dimensions of more than $10^6 \times 10^6$. For regular grids, the matrix A has a diagonal structure for a three-dimensional physical solution problem, and is represented usually by a band matrix.

Usually the matrix equation is processed by an iteration of the linear solver, based on a conjugate gradient method. The solver uses matrix data for multiple computational passes and the requirements for memory bandwidth grows with increasing grid size.

DETAILED DESCRIPTION

Figure 1:
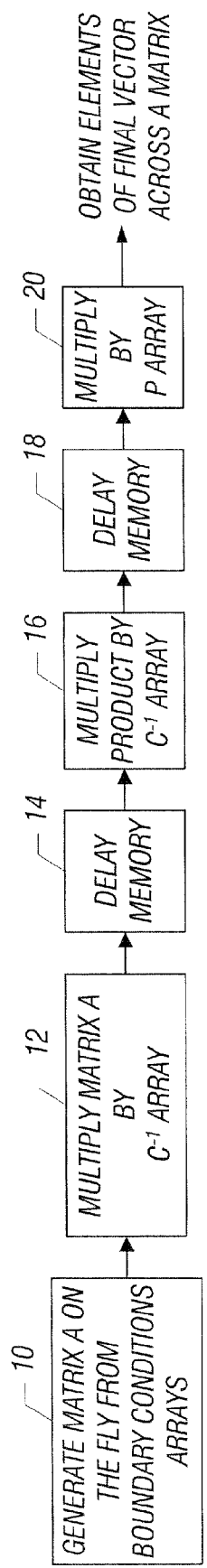
FIG. 1 is a flow chart for one embodiment.

By generating the matrix A on the fly without storing the matrix A in memory, memory traffic and memory requirements may be drastically reduced in some embodiments. As used herein, "on the fly" means deriving the matrix A in the course of solving the Navier-Stokes equation by multiplication. The matrix A may be represented by a small data set of von Neumann and Dirichlet boundary conditions which may be at least eight times smaller than the size of the coefficient matrix A.

Some embodiments may use hardware acceleration devices which apply massive parallelism to speed up matrix equation solutions. Other embodiments may use symmetric single instruction multiple data (SIMD) processors.

The fluid dynamics simulator initially updates surfaces' and particles' positions. Then velocities for explicit surfaces are advanced. The von Neumann and Dirichlet conditions are obtained. Then the Navier-Stokes equation is solved for pressure and velocity. Finally, the velocity and strain across the surface borders are extrapolated. The operation of standard fluid dynamics simulators based on the use of the matrix A is set forth in Stanley Osher, Ronald Fedkiw, Level Set Method and Dynamic Implicit Surfaces, Springer-Verlag, New York, 2003. ISBN 0-387-95482-1.

The standard computation scheme for solving Navier-Stokes equations builds a symmetric coefficient matrix A. Matrix coefficients, however, depend only on boundary condition information. Since floating point numbers are used to represent matrix equation coefficients, a band matrix requires 16*n*m*nm coefficients, where n, m, and nm are the dimensions of a grid element of n by m by nm cells, where fluid flow is computed for the seven diagonal symmetric matrix that includes four bands with four byte floating point numbers.

This matrix may be built using a boundary conditions matrix which requires only 2*n*m*nm memory bytes for storing von Neumann and Dirichlet boundary conditions. The information may be presented as a bit array using only (n*m*nm)*2 memory bytes. The benefit of such a data representation may be that the data, which is stored in the boundary conditions for a grid element, is sufficient for generation of the matrix A coefficients for this grid element.

For example, the von Neumann boundary conditions may be stored as six bits, wherein three bits ($1^{st}$, $2^{nd}$, and $5^{th}$ bits below) are used for three boundary conditions for the current cell and an additional three bits ($0^{th}$, $3^{rd}$, and $4^{th}$ bits below) are used for the boundary conditions for neighboring cells:

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| Not-used | Not-used | $\psi_N^w(i,j,ij)$ | $\psi_N^w(i,j,ij+1)$ | $\psi_N^v(i,j,ij)$ | $\psi_N^v(i,j+1,ij)$ | $\psi_N^u(i,j,ij)$ | $\psi_N^u(i+1j,ij)$ |

The Dirichlet boundary conditions may be stored in four bits, where there is a Dirichlet boundary condition for the current cell (see $0^{th}$ bit below) and there are boundary conditions for three neighboring cells ($1^{st}$, $2^{nd}$, and $3^{rd}$ bits below) to that cell:

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| Not-used | Not-used | Not-used | Not-used | $\psi_D(i,j,ij+1)$ | $\psi_D(i,j+1,ij)$ | $\psi_D(i+1,j,ij)$ | $\psi_D(i,j,ij)$ |

A storage scheme allows reconstruction of all matrix coefficients using only two bytes of data, one byte made up of six bits and the other byte made up of four bits for the boundary conditions for a grid matrix. The memory requirement for boundary conditions for one grid element under these conditions is only ten bits.

In one embodiment, a preconditioned conjugate gradient method may be used. See Golub, G. H., Van Loan, C. F. "Matrix Computations," Johns Hopkins University Press, 1989, I.S.B.N. 0-8018-3739-1. The preconditioned conjugate gradient method is well suited for multi-threaded processing due to its coarse grain parallelism and this property of the solver may be selectively employed using a symmetric multiprocessor.

The symmetric multiprocessor may compute the solution of the equation $C^{-1}AC^{-1}p$, where $C^{-1}$ is a diagonal pre-conditioner matrix, A is the seven diagonal coefficient matrix, and p is a vector. The solution may be successfully optimized by generating the matrix A on the fly, using the boundary conditions data, as described above.

Thus, referring to FIG. 1, a six bit von Neumann boundary condition array is developed and a four bit Dirichlet boundary condition array is developed, as indicated in block 10. The matrix A is generated on the fly using the boundary condition arrays.

The $C^{-1}$ array is multiplied by the matrix A at block 12. A delay memory may be used, as indicated at block 14. A delay memory is used for temporarily handling matrix coefficients in a queue before the data can be fetched for a multiplication operation. Then the product of matrix A and the $C^{-1}$ array is again multiplied by the array $C^{-1}$ in block 16. After another delay memory block (block 18), the p array is multiplied by the $C^{-1}AC^{-1}$ product in block 20. The result is to obtain the elements of the final vector across the matrix A.

The computation method uses the von Neumann conditions and the Dirichlet conditions for matrix generation. The generated a, b, c, d coefficients, which are the main diagonal and three other diagonals, are multiplied twice by the diagonal $C^{-1}$ matrix. Then that result is multiplied by the vector p, forming a new result vector. The length of the new result vector is n*m*nm elements.

The computations may be fully pipelined, in some embodiments, and a new element of result vector can be generated each cycle. This scheme fits the SIMD processing units or any vector processor in an effective way. The conjugate gradient solver can be improved by using 16 byte wide SIMD instructions. The conjugate gradient solver performs vector by vector and vector by matrix multiplication. A hardware accelerator, such as a special chip or a programmable logic array, may be used.

Figure 2:
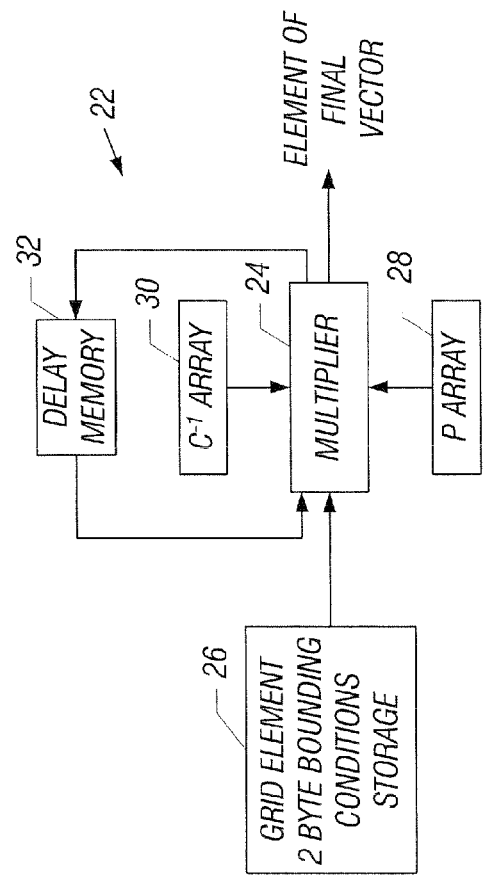
FIG. 2 is a hardware depiction for one embodiment.

Referring to FIG. 2, a storage 26 is used to store the two byte boundary conditions for a grid element. The information from the storage 26 is read by a multiplier 24. The multiplier uses that information to do the multiplication $C^{-1}AC^{-1}p$ and, particularly, uses the storage 26 to derive the matrix A on the fly without having to store the entire matrix, but, instead, only storing the boundary conditions which are much smaller. Thus, the multiplier multiplies information from the P array storage 28 and the $C^{-1}$ array storage 30. A delay memory element 32 may be used as a temporary storage during the multiplications. Thus, the apparatus 22 may be used to determine the elements of the final vector. It may be implemented as a hardware accelerator in one embodiment. In another embodiment, it may be implemented as a symmetric SIMD processor. The accelerator, shown in FIG. 2, may be designed by mapping the accelerator into a SIMD processor.

The von Neumann and Dirichlet boundary condition arrays may be compressed, in one embodiment, using straightforward run length encoding (RLE) methods, where a sequence of equal numbers <n> <n> <n> . . . <n> is compressed down to two numbers <C> <n> where C is the number of <n> repetitions in the original sequence. This is because their boundary condition information is very repetitive. Using the RLE method to compress the boundary conditions does not affect computational speed. This method uses only sequential access to the boundary condition arrays. RLE may be successfully implemented in any Reduced Instruction Set Computing/Complex Instruction Set Computing (RISC/CISC) processor unit.

In the RLE coding, unused bits of the above-described von Neumann and Dirichlet condition representations are used. Pure boundary condition bytes have the seventh bit cleared. If this bit is set, the lower seven bits of the byte, n, are treated as a counter and a byte which immediately follows the counter must be repeated n times:

| 7 | 6 | 5 | 4 | 3 | 2 | 1 | 0 |
|---|---|---|---|---|---|---|---|
| 0 | X | X | X | X | X | X | X |

An example of RLE coding is a "pure" data byte for $\psi_N$ or $\psi_D$ (shown above), and the following two bytes:

| 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|
| 1 | 0 | 0 | 0 | 0 | 0 | 1 | 1 | 0 | 1 | 1 | 0 | 1 | 1 | 0 | 1 | are unpacked into three "101101101" bytes. Each box (2 horizontal lines by 8 vertical columns) is an 8-bit byte representation. The first line is just the bit numbers. The second line is the content of the bit (0, 1, or X—any value: 0, or 1). In this example, the first byte (on the left) is a counter since its seventh bit is set (i.e. 1) and the repetition C is three because bits 0 and 1 indicate three in binary. The second byte (on the right above) is the repetitive sequence.

The processing techniques described herein may be implemented in various hardware architectures. For example, processing functionality may be integrated within a chipset. Alternatively, a discrete processor may be used. As still another embodiment, the functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   storing arrays of Dirichlet and von Neumann boundary conditions in a memory;
   developing a Navier-Stokes matrix A on the fly from said boundary conditions arrays using a data processor; and
   multiplying said matrix A to solve the Navier-Stokes equation using a data processor including representing the von Neumann and Dirichlet boundary conditions for a grid element by two bytes.

2. The method of claim 1 including multiplying the matrix A times a diagonal preconditioner matrix.

3. The method of claim 2 including multiplying the matrix A by the diagonal preconditioner matrix twice.

4. The method of claim 3 including providing a delay memory after each multiplication by said preconditioner matrix.

5. The method of claim 4 including multiplying the product of the preconditioner matrix and the matrix A by a vector p.

6. The method of claim 5 including using run length encoding to compress the von Neumann and Dirichlet boundary conditions arrays.

7. The method of claim 1 including using six bits to represent the von Neumann boundary conditions and four bits to represent the Dirichlet boundary conditions.

8. The method of claim 1 including multiplying using a symmetric single instruction multiple data processor.

9. The method of claim 1 including multiplying using a hardware accelerator.

10. An apparatus comprising:
a storage to store arrays of Dirichlet and von Neumann boundary conditions; and
a processor to develop the Navier-Stokes matrix A on the fly from said arrays and to multiply the matrix A to solve the Navier-Stokes equation, said processor to use run length encoding to compress the von Neumann and Dirichlet boundary conditions arrays.

11. The apparatus of claim 10 wherein said apparatus includes a single instruction multiple data processor.

12. The apparatus of claim 10 wherein said apparatus includes a hardware accelerator.

13. The apparatus of claim 10 wherein said multiplier multiply the matrix A by a diagonal preconditioner matrix.

14. The apparatus of claim 13 wherein said processor to multiply the matrix A by the diagonal preconditioner matrix twice.

15. The apparatus of claim 14 including a delay memory to provide a storage after each multiplication by a preconditioner matrix.

16. The apparatus of claim 15, said processor to multiply the product of the preconditioner matrix and the matrix A by a vector p.

17. The apparatus of claim 10, said processor to represent the von Neumann and Dirichlet boundary conditions for a grid element by two bytes.

18. The apparatus of claim 17, said processor to use six bits to represent the von Neumann boundary conditions and four bits to represent the Dirichlet boundary conditions.

19. The apparatus of claim 17, said processor to use six bits to represent the von Neumann boundary conditions and four bits to represent the Dirichlet boundary conditions.

20. A method comprising: storing arrays of Dirichlet and von Neumann boundary conditions in a memory; developing a Navier-Stokes matrix A on the fly from said boundary conditions using a data processor; and multiplying said matrix A to solve the Navier-Stokes equation including using run length encoding to compress the von Neumann and Dirichlet boundary conditions arrays.

21. The method of claim 20 including representing the von Neumann and Dirichlet boundary conditions for a grid element by two bytes.

22. The method of claim 21 including using six bits to represent the von Neumann boundary conditions and four bits to represent the Dirichlet boundary conditions.

23. An apparatus comprising:
a storage to store arrays of Dirichlet and von Neumann boundary conditions; and
a processor to develop the Navier-Stokes matrix A on the fly from said arrays and to multiply the matrix A to solve the Navier-Stokes equation, said processor to represent the von Neumann and Dirichlet boundary conditions for a grid element by two bytes.

\* \* \* \* \*